(12) United States Patent
Ng et al.

(10) Patent No.: US 10,581,878 B2
(45) Date of Patent: Mar. 3, 2020

(54) DETECTION OF CROSS-SITE ATTACKS USING RUNTIME ANALYSIS

(71) Applicant: EntIT Software LLC, Sunnyvale, CA (US)

(72) Inventors: Ming Sum Sam Ng, Hong Kong (HK); Oleksandr Mirosh, Zabierzow (PL); Alvaro Munoz Sanchez, Las Rozas (ES)

(73) Assignee: Micro Focus LLC, Santa Clara, CA (US)

(*) Notice: Subject to any disclaimer, the term of this patent is extended or adjusted under 35 U.S.C. 154(b) by 280 days.

(21) Appl. No.: 15/617,048

(22) Filed: Jun. 8, 2017

(65) Prior Publication Data

US 2018/0359265 A1 Dec. 13, 2018

(51) Int. Cl.
H04L 29/06 (2006.01)
H04L 29/08 (2006.01)
G06F 21/55 (2013.01)

(52) U.S. Cl.
CPC ........ H04L 63/1416 (2013.01); G06F 21/554 (2013.01); H04L 63/0281 (2013.01); H04L 63/1466 (2013.01); H04L 67/02 (2013.01)

(58) Field of Classification Search
CPC .......... G06F 11/00; G06F 21/06; G06F 15/16; G06F 12/14; G06F 9/00; G06F 21/00; G06F 21/554; G06Q 30/00; H04L 12/911; H04L 63/1416; H04L 63/0281; H04L 63/1466; H04L 67/02

USPC ........... 726/22, 23, 25; 705/14.49; 709/226; 713/194

See application file for complete search history.

(56) References Cited

U.S. PATENT DOCUMENTS

| | | | |
|---|---|---|---|
| 8,341,200 B2 | 12/2012 | Corella | |
| 8,495,135 B2 | 7/2013 | Amit et al. | |
| 8,856,869 B1 | 10/2014 | Brinskelle | |
| 9,131,382 B1 | 9/2015 | Johns et al. | |
| 9,680,860 B1* | 6/2017 | Wallace | H04L 63/1433 |
| 2012/0180129 A1* | 7/2012 | Shulman | H04L 63/1416 726/22 |
| 2014/0047118 A1* | 2/2014 | Baumback | G06F 9/5061 709/226 |
| 2014/0137189 A1 | 5/2014 | Hansen | |

OTHER PUBLICATIONS

Niqing Mao et al., "Defeating Cross-site Request Forgery Attacks with Browser-enforced Authenticity Protection," 2009, pp. 1-19, Purdue University, Indiana, USA.

* cited by examiner

Primary Examiner — Thanhnga B Truong (57) ABSTRACT

A method for attack detection includes: intercepting, by a runtime security agent, a request for a web resource; determining whether the intercepted request was triggered from an external website; determining whether the intercepted request was triggered from a current session; determining whether the intercepted request is requesting a static file type; and in response to a determination that the intercepted request was triggered from an external website and was not triggered from a current session, or a determination that the intercepted request was triggered from an external website and is not requesting a static file type, providing, by the runtime security agent, an indication of a potential attack.

20 Claims, 6 Drawing Sheets

DETECTION OF CROSS-SITE ATTACKS USING RUNTIME ANALYSIS

BACKGROUND

Computer systems may be subject to security attacks or exploits. For example, a Cross Site Request Forgery (CSRF) attack may involve a malicious website causing a browser of a user to send an unauthorized command to a web server using an existing logged-on session. In this manner, the CSRF attack may access private data of the user, or may initiate changes on the web server without the user's knowledge or approval. For example, a malicious website can trigger the browser to send a request to an email provider to delete a particular email.

BRIEF DESCRIPTION OF THE DRAWINGS

Some implementations are described with respect to the following figures.

DETAILED DESCRIPTION

A company or entity may provide a website or web service to authorized users. For example, a website of a bank may allow a user to deposit, manage, and/or transfer money in the user's account at the bank. The provider may wish to detect Cross Site Request Forgery (CSRF) attacks that affect its users, and to take action to address such attacks. However, some detection techniques may not correctly identify CSRF attacks, and may result in a high false-positive rate (e.g., a high proportion of events erroneously identified as CSRF attacks).

In accordance with some implementations, examples are provided for detection of possible CSRF attacks. As described further below with reference to FIGS. 1-6, some implementations may include analyzing characteristics of a request to determine whether the request is likely to be part of a CSRF attack. In some implementations, such characteristics may include whether the request was triggered from an external website, whether the request was triggered from a current session, and whether the intercepted request is requesting a static file type. As used herein, a website is "external" to a server if a session established by the server is not intended to be accessed or used by content of the website. In some examples, the server and an external website are not owned or operated by the same entity. As used herein, a "static" file type refers to a resource that does not itself perform an action when loaded, such as image files, stylesheets, and so forth. Some implementations may provide detection of CSRF attacks without a high false-positive rate.

Figure 1:
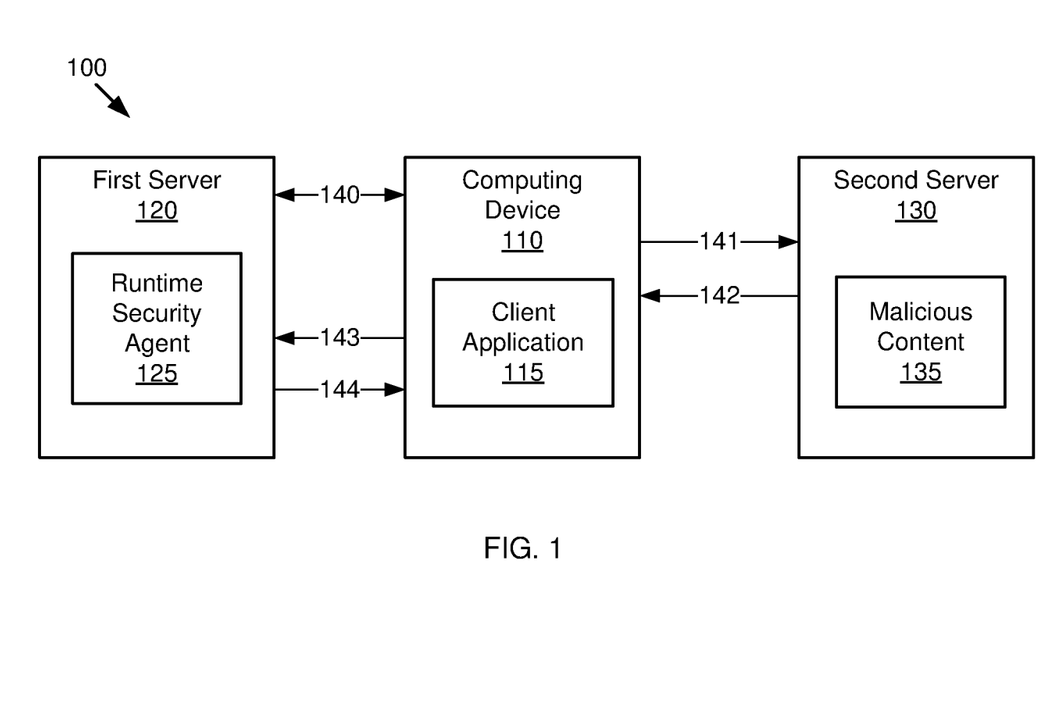
FIG. 1 is a schematic diagram of an example system, in accordance with some implementations.

FIG. 1 shows a schematic diagram of an example system 100, in accordance with some implementations. As shown, in some implementations, the system 100 may include a computing device 110, a first server 120, and a second server 130. The computing device 110 may be, for example, a desktop computer, a laptop, a smartphone, and so forth. In some implementations, the computing device 110 may include a client application 115 (e.g., a browser or other application). The computing device 110 may be connected to the first server 120 and the second server 130 via a network connection (e.g., a wired and/or wireless network).

In some examples, the client application 115 may send and/or receive data 140 to establish a session with the first server 120. For instance, the client application 115 may provide login data to a secure website provided by the first server 120 (e.g., an email service, a banking webpage, etc.), and may receive a cookie to establish a session with the first server 120. In some examples, the client application 115 may be a browser that can process and display webpages composed using HyperText Mark-up Language (HTML).

In some examples, after establishing the session with the first server 120, the client application 115 may access 141 the second server 130, and may receive a response 142 (e.g., a webpage) that includes malicious content 135. Assume that the malicious content 135 is hidden, and thus a user of the client application 115 may not be aware of the malicious content 135. For example, the response 142 may include a link that appears to request an embedded image, but may actually send a command to the first server 120 (e.g., "<img src='http:/firstserver/delete'>"). In another example, the response 142 may trigger a form submission in a manner that is not visible to a user of the client application 115 (e.g., an invisible HTML frame, a zero-pixel pop-up window, etc.)

In some examples, the malicious content 135 may cause the client application 115 to send a request 143 to the first server 120. Further, because the client application 115 had previously established the session with the first server 120, the request 143 may be authorized to access data and/or perform changes on the first server 120 (e.g., read private information, transfer funds, etc.). In some examples, the request 143 may cause the first server 120 to provide a response 144 to the client application 115.

In some implementations, the first server 120 may include or execute a runtime security agent 125. The runtime security agent 125 may analyze content and/or characteristics of a request received by the first server 120 (e.g., request 143) to determine whether the request is likely to be generated by a CSRF attack. If so, the runtime security agent 125 may provide an indication or warning of a potential CSRF attack. Further, the runtime security agent 125 may initiate mitigation action(s) for a potential CSRF attack.

Figure 2:
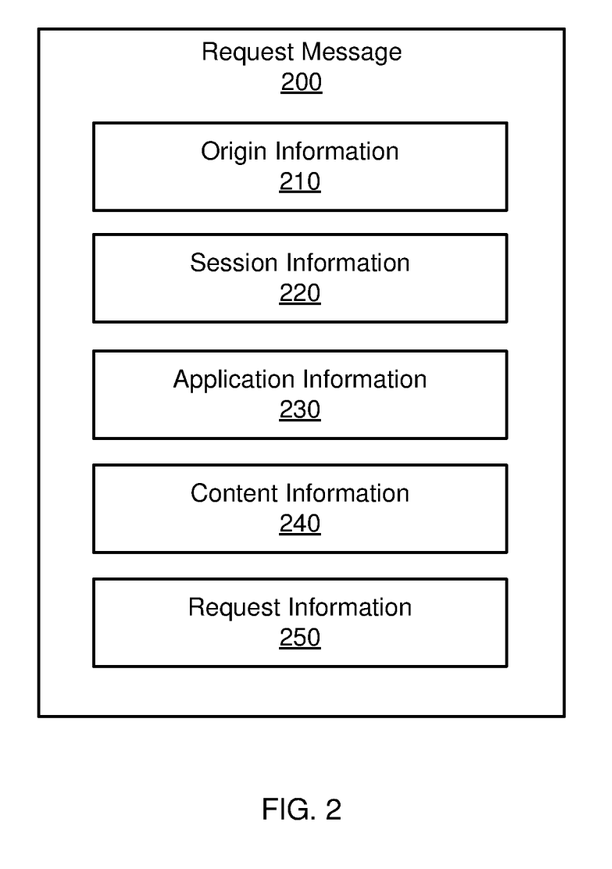
FIG. 2 is an illustration of an example request message in accordance with some implementations.

In some implementations, the requests analyzed by the runtime security agent 125 may be included in messages that conform to a network protocol (e.g., HTTP request messages). Referring now to FIG. 2, shown is an illustration of an example request message 200 in accordance with some implementations. As shown, the request message 200 may include origin information 210, session information 220, application information 230, content information 240, and/or request information 250.

In some implementations, the origin information 210 may identify the originating source of the request. For example, the origin information 210 may include an HTTP Origin header that may indicate a server where the request originated. In another example, the origin information 210 may include an HTTP Referrer header that may specify the address of a previous web page from which a link to the request was followed.

In some implementations, the session information 220 may specify a current session of the application (e.g., client application 115 shown in FIG. 1) that sent the request. For example, the session information 220 may include a HTTP Cookie header including session cookies previously received from a server.

In some implementations, the application information 230 may identify the application that sent the request. For example, the application information 230 may include an HTTP User-Agent header identifying an application type, vendor, version, operating system, and so forth.

In some implementations, the content information 240 may specify characteristics of content that the sending application can receive in response to the request. For example, the content information 240 may include HTTP Accept headers specifying valid content types, character sets, encodings, languages, ranges, and so forth.

In some implementations, the request information 250 may specify the request to be performed. For example, the request information 250 may indicate an HTTP method (e.g., "GET," "POST," etc.), an embedded resource to load, a network path, and so forth.

Figure 3:
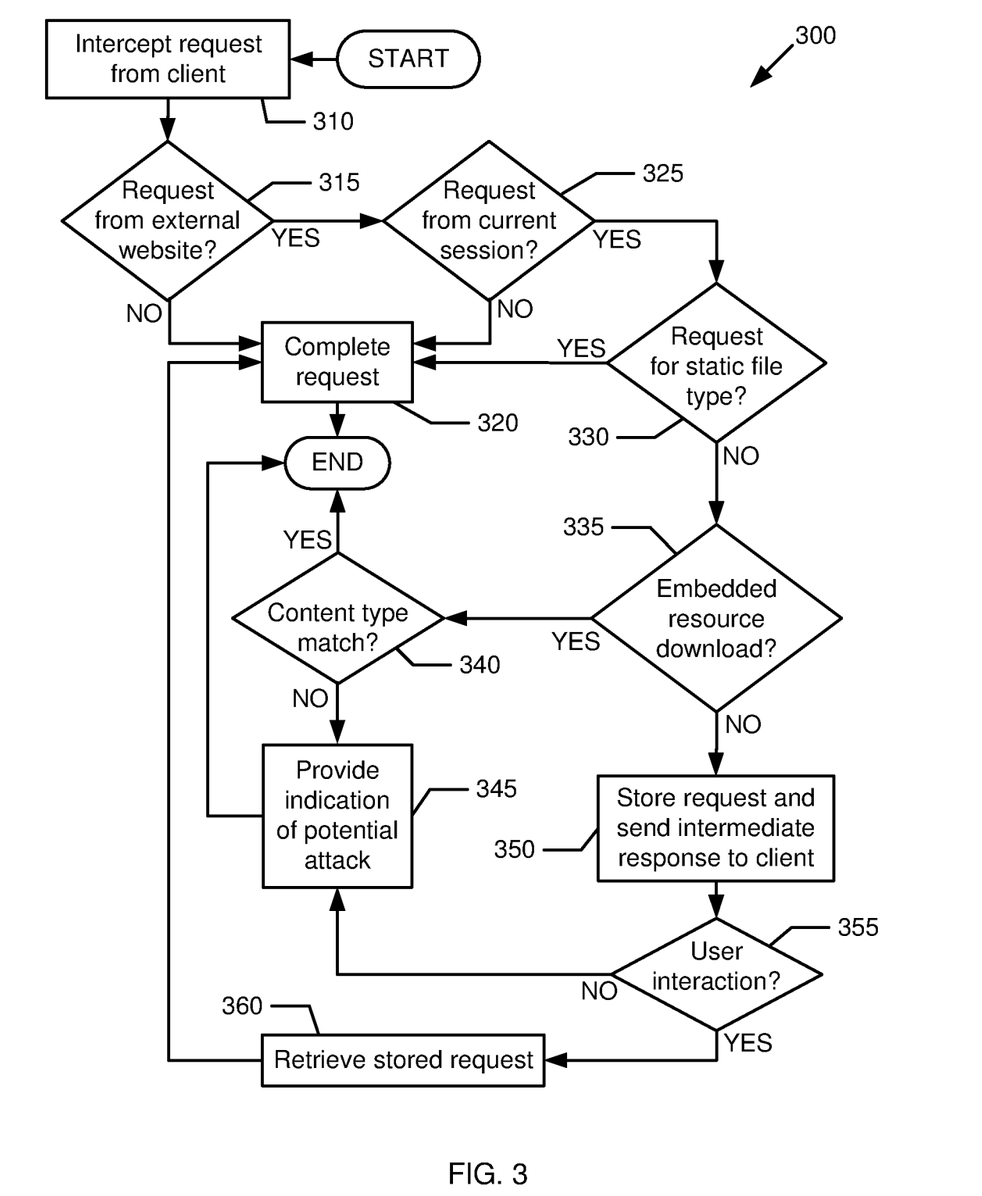
FIG. 3 is a flow diagram of an example process for attack detection, in accordance with some implementations.

Referring now to FIG. 3, shown is an example process 300 for attack detection, in accordance with some implementations. In some examples, the process 300 may be performed by the runtime security agent 125 shown in FIG. 1. The process 300 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1-2, which show examples in accordance with some implementations. However, other implementations are also possible.

Block 310 may include intercepting a request from a client for a web resource. For example, referring to FIG. 1, the runtime security agent 125 may intercept the request 143 sent by the client application 115 to the first server 120.

At diamond 315, a determination is made as to whether the intercepted request was triggered from an external website. For example, referring to FIGS. 1-2, the runtime security agent 125 of the first server 120 may evaluate the origin information 210 (e.g., an HTTP Origin header, an HTTP Referrer header, etc.) to determine whether the request message 200 was triggered from an external website (e.g., a website that is not intended or permitted to use sessions established by the first server 120). In some examples, the first server 120 may include a stored exception list of websites and/or domains that are specified as being able to access sessions of the first server 120. Thus, in such examples, a website may be determined to be external if it is not listed in the stored exception list.

If it is determined at diamond 315 that the intercepted request was not triggered from an external website, then at block 320, the request may be completed. For example, referring to FIG. 1, the first server 120 may perform the request 143. After block 320, the process 300 is completed.

However, if it is determined at diamond 315 that the intercepted request was triggered from an external website, then at diamond 325, a determination is made as to whether the intercepted request is triggered from a current session. For example, referring to FIGS. 1-2, the runtime security agent 125 of the first server 120 may evaluate the session information 220 (e.g., an HTTP Cookie header) to determine whether the request message 200 is associated with a current session between the first server 120 and the client application 115.

If it is determined at diamond 325 that the intercepted request was not triggered from a current session, then at block 320, the request may be completed. However, if it is determined at diamond 325 that the intercepted request was triggered from a current session, then at diamond 330, a determination is made as to whether the intercepted request is for a static file type. For example, referring to FIGS. 1-2, the runtime security agent 125 may evaluate the request information 250 to determine whether the request message 200 is requesting a resource or file having a name extension (e.g., ".jpg," ".png," ".img," ".css," etc.) that indicates a static file type (e.g., an image file, a stylesheet, etc.). In some examples, static file types include resources that do not perform actions such as reading data, executing commands, deleting data, and so forth.

If it is determined at diamond 330 that the intercepted request is for a static file type, then at block 320, the request may be completed. However, if it is determined at diamond 330 that the intercepted request is not for a static file type, then at diamond 335, a determination is made as to whether the intercepted request is for an embedded resource download. For example, referring to FIGS. 1-2, the runtime security agent 125 may evaluate the application information 230 (e.g., an HTTP User-Agent header) and/or the content information 240 (e.g., an HTTP Accept header) to determine whether the request message 200 is for an embedded resource download, or instead is for regular page browsing.

If it is determined at diamond 335 that the intercepted request is for an embedded resource download, then at diamond 340, a determination is made as to whether the content type of the embedded resource matches a content type specified in the intercepted request. For example, referring to FIGS. 1-2, the runtime security agent 125 may compare a content type of the request 143 (e.g., using the content information 240) to a content type of an embedded resource in the response 144.

If it is determined at diamond 340 that the content type of the embedded resource matches the content type of the intercepted request, the process 300 is completed. However, if it is determined at diamond 340 that the content type of the embedded resource does not match the content type of the intercepted request, then at block 345, an indication of a potential attack may be provided. For example, referring to FIGS. 1-2, the runtime security agent 125 may generate a message, signal, or interrupt indicating that a potential CSRF attack has been detected. In some implementations, the indication of the potential attack may be provided to a human user or software that monitors the first server 120 (e.g., a website administrator). After block 345, the process 300 may be completed.

Referring again to diamond 335, if it is determined that the intercepted request is not for an embedded resource download, then at block 350, the intercepted requested may be stored in a storage location, and an intermediate response may be sent to the client. For example, referring to FIG. 1, the runtime security agent 125 may store the request 143 in a temporary storage location (e.g., an HTTP session variable). Further, the runtime security agent 125 may generate a temporary HTML page, and may send the temporary HTML page to the client application 115. In some examples, the HTTP header of the temporary HTML page may be set to instruct the client browser and proxy server(s) not to cache the response. Further, the HTTP header of the temporary HTML page may be set with parameters (e.g., "X-Frame-Options," "Content-Security-Policy: frame-ancestors," and so forth) to ensure that the response will not be loaded within a frame. In some examples, the temporary HTML page may include a script (e.g., using JavaScript) to ensure that the window size is sufficient to be visible to a user, or otherwise to send an error report back to the server.

At diamond 355, a determination is made as to whether a user interaction is detected by the intermediate response sent to the client. For example, referring to FIG. 1, the temporary HTML page (generated by the runtime security agent 125) may be displayed by the client application 115. In some examples, the temporary HTML page may include a script to detect a user interaction (e.g., an "OnMouseOver" event) in the temporary HTML page within a defined time threshold (e.g., within five seconds).

If it is determined at diamond 355 that a user interaction has been detected within the defined time frame, then at block 360, the stored request may be retrieved from the storage location. Further, at block 320, the request is completed. For example, referring to FIG. 1, the runtime security agent 125 may retrieve the request 143 from the temporary storage location, and may execute the retrieved request 143. However, if it is determined at diamond 355 that a user interaction has not been detected within the defined time frame, then at block 345, an indication of a potential attack may be provided. After block 345 or block 320, the process 300 is completed.

Figure 4:
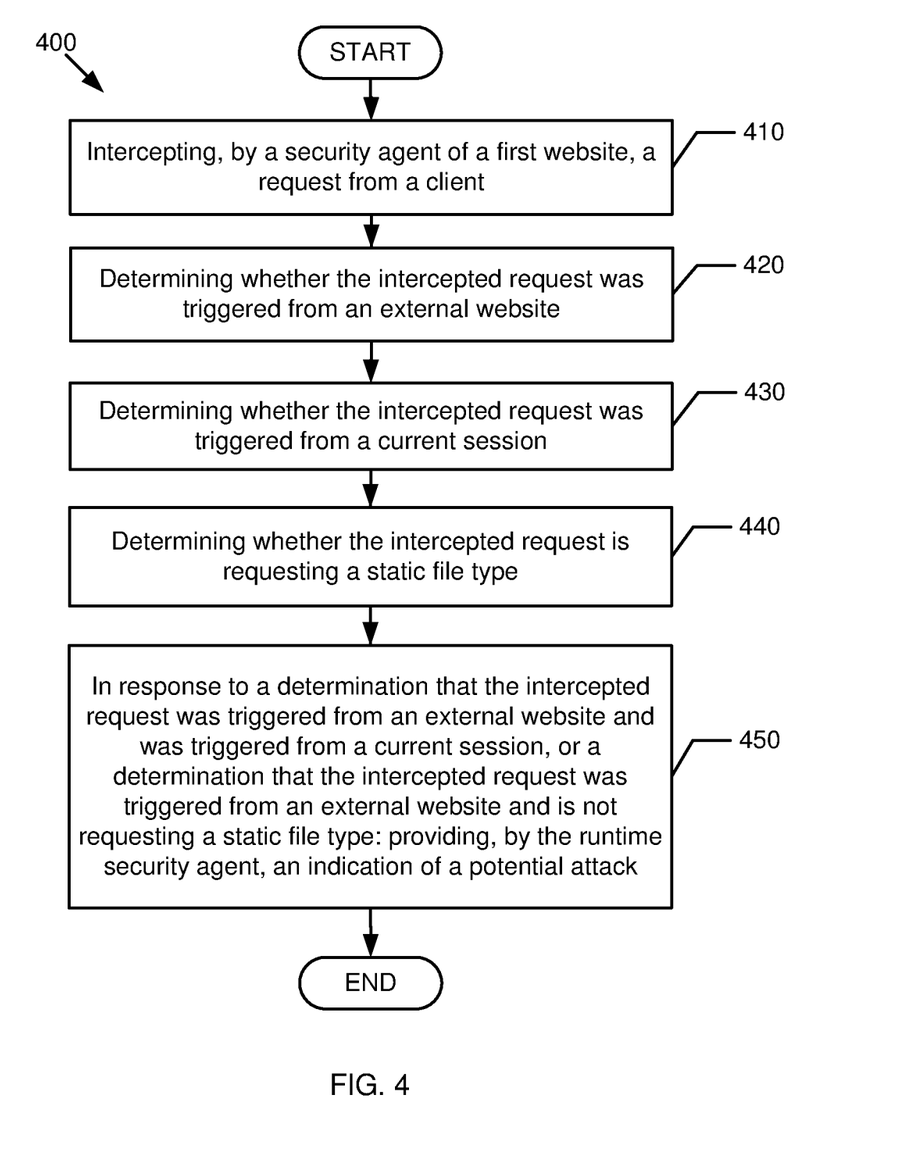
FIG. 4 is a flow diagram of an example process for attack detection, in accordance with some implementations.

Referring now to FIG. 4, shown is an example process 400 for attack detection, in accordance with some implementations. In some examples, the process 400 may be performed by the runtime security agent 125 shown in FIG. 1. The process 400 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1-2, which show examples in accordance with some implementations. However, other implementations are also possible.

Block 410 may include intercepting, by a runtime security agent, a request for a web resource. Block 420 may include determining whether the intercepted request was triggered from an external website. Block 430 may include determining whether the intercepted request was triggered from a current session. Block 440 may include determining whether the intercepted request is requesting a static file type.

Block 450 may include, in response to a determination that the intercepted request was triggered from an external website and was not triggered from a current session, or a determination that the intercepted request was triggered from an external website and is not requesting a static file type, providing, by the runtime security agent, an indication of a potential attack. After block 450, the process 400 is completed.

Figure 5:
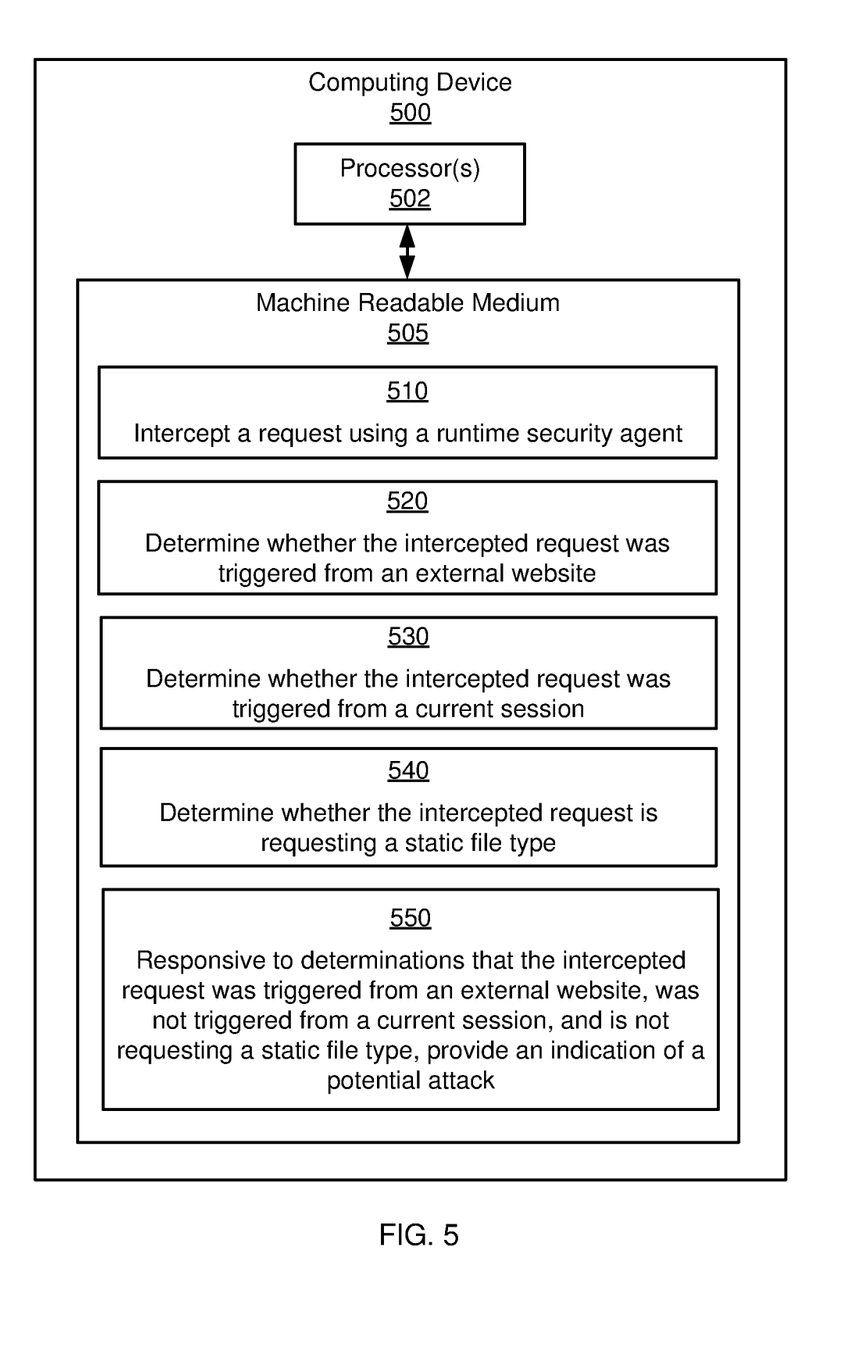
FIG. 5 is a schematic diagram of an example computing device, in accordance with some implementations.

Referring now to FIG. 5, shown is a schematic diagram of an example computing device 500. In some examples, the computing device 500 may correspond generally to the first server 120 shown in FIG. 1. As shown, the computing device 500 may include a hardware processor(s) 502 and machine-readable storage medium 505. The machine-readable storage medium 505 may be a non-transitory medium, and may store instructions 510-550. The instructions 510-550 can be executed by the hardware processor(s) 502.

Instruction 510 may intercept a request using a runtime security agent. Instruction 520 may determine whether the intercepted request was triggered from an external website. Instruction 530 may determine whether the intercepted request was triggered from a current session. Instruction 540 may determine whether the intercepted request is requesting a static file type. Instruction 550 may, responsive to determinations that the intercepted request was triggered from an external website, was not triggered from a current session, and is not requesting a static file type, provide an indication of a potential attack.

Figure 6:
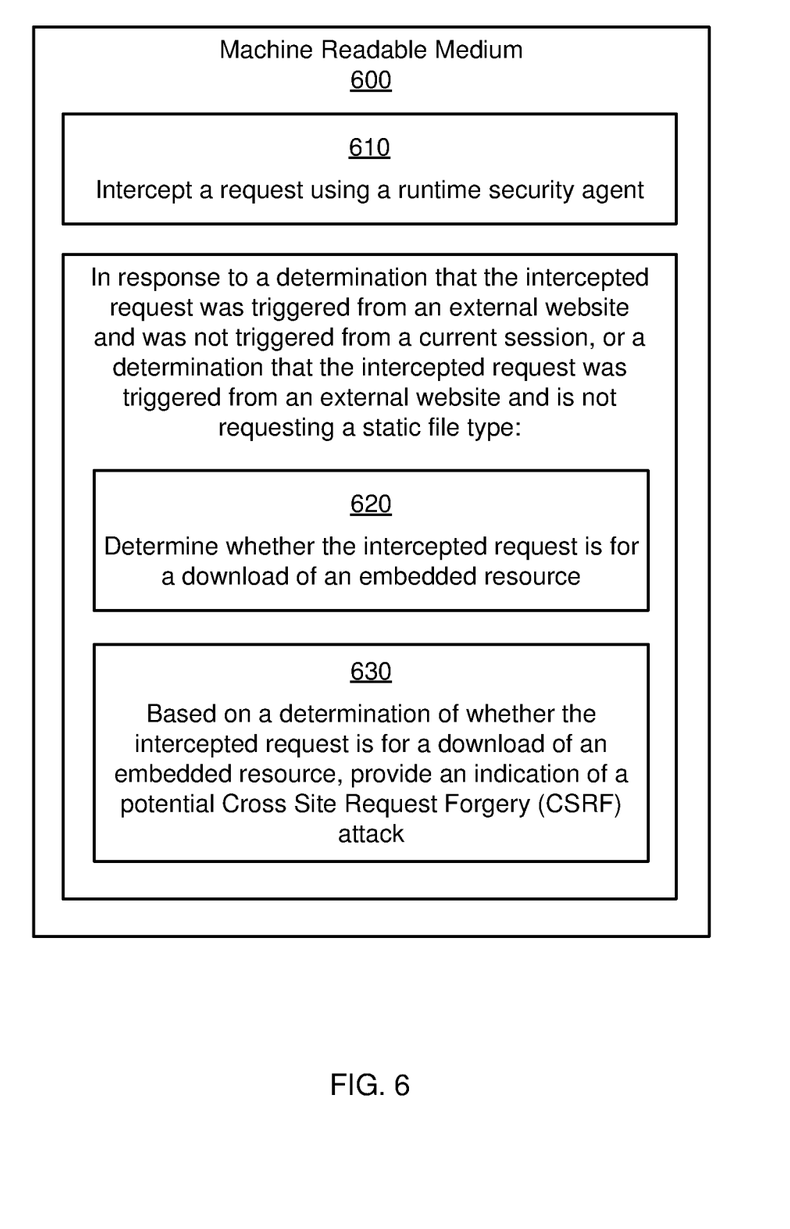
FIG. 6 is a diagram of an example machine-readable storage medium storing instructions in accordance with some implementations.

Referring now to FIG. 6, shown is a machine-readable storage medium 600 storing instructions 610-650, in accordance with some implementations. The instructions 610-650 can be executed by any number of processors (e.g., the processor 115 shown in FIG. 1). The machine-readable storage medium 600 may be any non-transitory computer readable medium, such as an optical, semiconductor, or magnetic storage device.

Instruction 610 may intercept a request using a runtime security agent. As shown, instructions 620 and 630 may be performed in response to a determination that the intercepted request was triggered from an external website and was not triggered from a current session, or a determination that the intercepted request was triggered from an external website and is not requesting a static file type. Instruction 620 may determine whether the intercepted request is for a download of an embedded resource. Instruction 630 may, based on a determination of whether the intercepted request is for a download of an embedded resource, provide an indication of a potential Cross Site Request Forgery (CSRF) attack.

In accordance with some implementations, examples are provided for detecting Cross Site Request Forgery (CSRF) attacks. Some implementations include a runtime security agent to intercept a request for a resource, determine whether the request was triggered from an external website, determine whether the request was triggered from a current session, and determine whether the intercepted request is requesting a static file type. Some implementations may provide detection of CSRF attacks without a high false-positive rate.

Note that, while FIGS. 1-6 show example implementations, other implementations are possible. For example, referring to FIG. 1, it is contemplated that the system 100 may include any number of devices or systems. Further, it is contemplated that the computing device 110, the first server 120, and/or the second server 130 may be implemented in a single device, in multiple device, or in arrangements that are different from that shown in FIG. 1. In another example, it is contemplated that the computing device 110, the first server 120, and/or the second server 130 may include additional components than those shown in FIG. 1. In yet another example, it is contemplated that the request message 200 shown in FIG. 2 may include additional fields, may have fewer fields, may use any data format, and so forth. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method for attack detection, comprising:
   intercepting, by a runtime security agent, a request for a web resource;
   determining whether the intercepted request was triggered from an external website;
   determining whether the intercepted request was triggered from a current session;
   determining whether the intercepted request is requesting a static file type; and
   in response to a determination that the intercepted request was triggered from the external website and was not triggered from the current session, or a determination that the intercepted request was triggered from the external website and is not requesting the static file type: providing, by the runtime security agent, an indication of a potential attack.

2. The method of claim 1, wherein the indication of the potential attack is provided only in response to a determination that the intercepted request was triggered from the external website, was not triggered from the current session, and is not requesting the static file type.

3. The method of claim 1, further comprising:
   determining whether the intercepted request is for a download of an embedded resource.

4. The method of claim 3, further comprising, in response to a determination that the intercepted request is for the download of the embedded resource:
   determining whether a content type of the downloaded embedded resource matches a content type specified in the intercepted request; and
   in response to a determination that the content type of the downloaded embedded resource does not match the content type specified in the intercepted request, providing the indication of the potential attack.

5. The method of claim 4, wherein the content type of the downloaded embedded resource is determined using a request header.

6. The method of claim 3, further comprising, in response to a determination that the intercepted request is not for the download of the embedded resource:
   storing the intercepted request in a storage location;
   sending an intermediate response to a client;
   determining whether a user interaction with the intermediate response has occurred within a defined time period; and
   in response to a determination that the user interaction with the intermediate response has not occurred within the defined time period, providing the indication of the potential attack.

7. The method of claim 6, further comprising, in response to a determination that the user interaction with the intermediate response has occurred within the defined time period:
   retrieving the intercepted request from the storage location; and
   completing the intercepted request retrieved from the storage location.

8. An article comprising a non-transitory machine-readable storage medium storing instructions that upon execution cause a processor to:
   intercept a request using a runtime security agent; and
   in response to a determination that the intercepted request was triggered from an external website and was not triggered from a current session, or a determination that the intercepted request was triggered from the external website and is not requesting a static file type:
      determine whether the intercepted request is for a download of an embedded resource; and
      based on a determination of whether the intercepted request is for the download of the embedded resource, provide an indication of a potential Cross Site Request Forgery (CSRF) attack.

9. The article of claim 8, wherein the instructions further cause the processor to:
   in response to a determination that the intercepted request is for the download of the embedded resource, determine whether a content type of the downloaded embedded resource matches a content type specified in the intercepted request; and
   in response to a determination that the content type of the downloaded embedded resource does not match the content type specified in the intercepted request, provide the indication of the potential CSRF attack.

10. The article of claim 9, wherein the content type of the downloaded embedded resource is determined using an HTTP User-Agent header and an HTTP Accept header.

11. The article of claim 8, wherein the instructions further cause the processor to, in response to a determination that the intercepted request is not for the download of the embedded resource:
   store the intercepted request in a storage location;
   send a temporary HyperText Mark-up Language (HTML) page to a client; and
   in response to a determination that a user interaction with the temporary HTML page has not occurred within a defined time period, provide the indication of the potential CSRF attack.

12. The article of claim 11, wherein the instructions further cause the processor to, in response to a determination that the user interaction with the temporary HTML page has occurred within the defined time period:
   retrieve the stored intercepted request from the storage location; and
   execute the retrieved intercepted request.

13. The article of claim 11, wherein the temporary HTML page includes a script to determine whether the user interaction with the temporary HTML page has occurred within the defined time period.

14. The article of claim 13, wherein the indication of the potential CSRF attack is provided only in response to determinations that the intercepted request was triggered from the external website, was not triggered from the current session, and is not requesting the static file type.

15. A computing device comprising:
   a hardware processor; and
   a machine-readable storage medium storing instructions, the instructions executable by the hardware processor to:
   intercept a request using a runtime security agent;
   determine whether the intercepted request was triggered from an external website;
   determine whether the intercepted request was triggered from a current session;
   determine whether the intercepted request is requesting a static file type; and
   responsive to a determination that the intercepted request was triggered from the external website, was not triggered from the current session, and is not requesting the static file type, provide an indication of a potential attack.

16. The computing device of claim 15, wherein the determination that the intercepted request was triggered from the external website is based on at least one of an HTTP Origin header and an HTTP Referrer header.

17. The computing device of claim 15, wherein the determination that the intercepted request was triggered from the current session is based on an HTTP Cookie header.

18. The computing device of claim 15, the instructions further executable to:
   determine whether the intercepted request is for a download of an embedded resource;
   in response to a determination that the intercepted request is for the download of the embedded resource, determine whether a content type of the downloaded embedded resource matches a content type specified in the intercepted request; and
   in response to a determination that the content type of the downloaded embedded resource does not match the content type specified in the intercepted request, provide the indication of the potential attack.

19. The computing device of claim 18, the instructions further executable to, in response to a determination that the intercepted request is not for the download of the embedded resource:
   store the intercepted request in a storage location;
   send an intermediate response page to a client; and
   in response to a determination that a user interaction with the intermediate response page has not occurred within a defined time period, provide the indication of the potential attack.

20. The computing device of claim 19, the instructions further executable to, in response to a determination that the user interaction with the intermediate response page has occurred within the defined time period:
   retrieve the stored intercepted request from the storage location; and
   execute the retrieved intercepted request.

* * * * *